United States Patent [19]

Smith

[11] 4,172,981

[45] Oct. 30, 1979

[54] LIGHTING SYSTEM

[75] Inventor: Eric H. Smith, St. Johns, Antigua

[73] Assignee: Francis H. Harrington, Hampton, N.H.

[21] Appl. No.: 915,881

[22] Filed: Jun. 15, 1978

[51] Int. Cl.² .................. H02J 9/06; H05B 41/392
[52] U.S. Cl. .................................. 307/66; 315/205; 315/223; 315/DIG. 4; 315/DIG. 7
[58] Field of Search .............. 315/DIG. 4, DIG. 7, 315/205, 219, 223; 331/112; 307/66

[56] References Cited

U.S. PATENT DOCUMENTS

| | | | |
|---|---|---|---|
| 2,930,989 | 3/1960 | Krieger | 315/219 X |
| 3,016,478 | 1/1962 | Kadell | 315/206 |
| 3,019,370 | 1/1962 | Basharrah | 315/206 |
| 3,283,144 | 11/1966 | Rogers | 315/DIG. 7 |
| 3,368,107 | 2/1968 | Skirvin | 315/DIG. 7 |
| 3,389,298 | 6/1968 | Skirvin | 315/206 |
| 3,467,887 | 9/1969 | Skirvin | 315/219 X |
| 3,501,674 | 3/1970 | Moore | 315/206 X |
| 3,573,544 | 4/1971 | Zonis et al. | 315/219 X |
| 3,629,648 | 12/1971 | Brown et al. | 315/DIG. 7 |
| 3,758,823 | 9/1973 | Jett et al. | 315/219 |

*Primary Examiner*—Alfred E. Smith
*Assistant Examiner*—Charles F. Roberts
*Attorney, Agent, or Firm*—Laurence R. Brown

[57] ABSTRACT

A highly energy efficient lighting system for fluorescent lamps is provided comprising a blocking oscillator having a dimmer for reducing power consumption. In one embodiment a built in power supply transformer and a battery charger provides for AC operation, portability, and emergency lighting situations. The fluorescent lamp is excited in an energy efficient manner by a high frequency blocking oscillator circuit and the dimmer permits reduction of light output reducing power drain even further thereby enabling longer battery operation, reduced size, and reduced operation costs. Also the dimming feature is important in establishing a proper mood simulating candlelight, etc.

20 Claims, 7 Drawing Figures

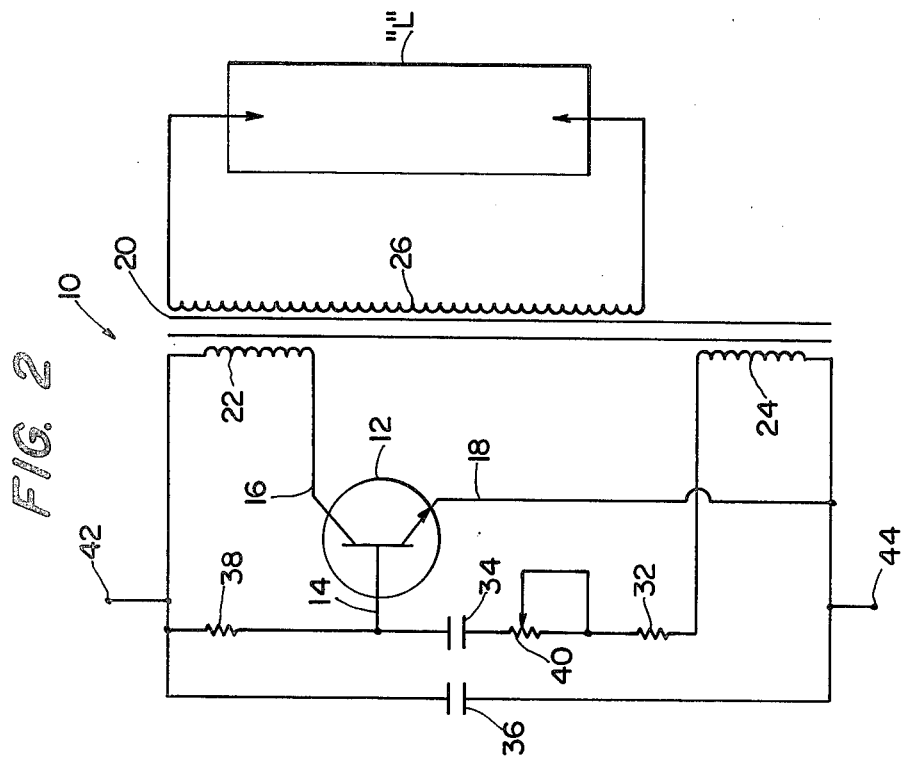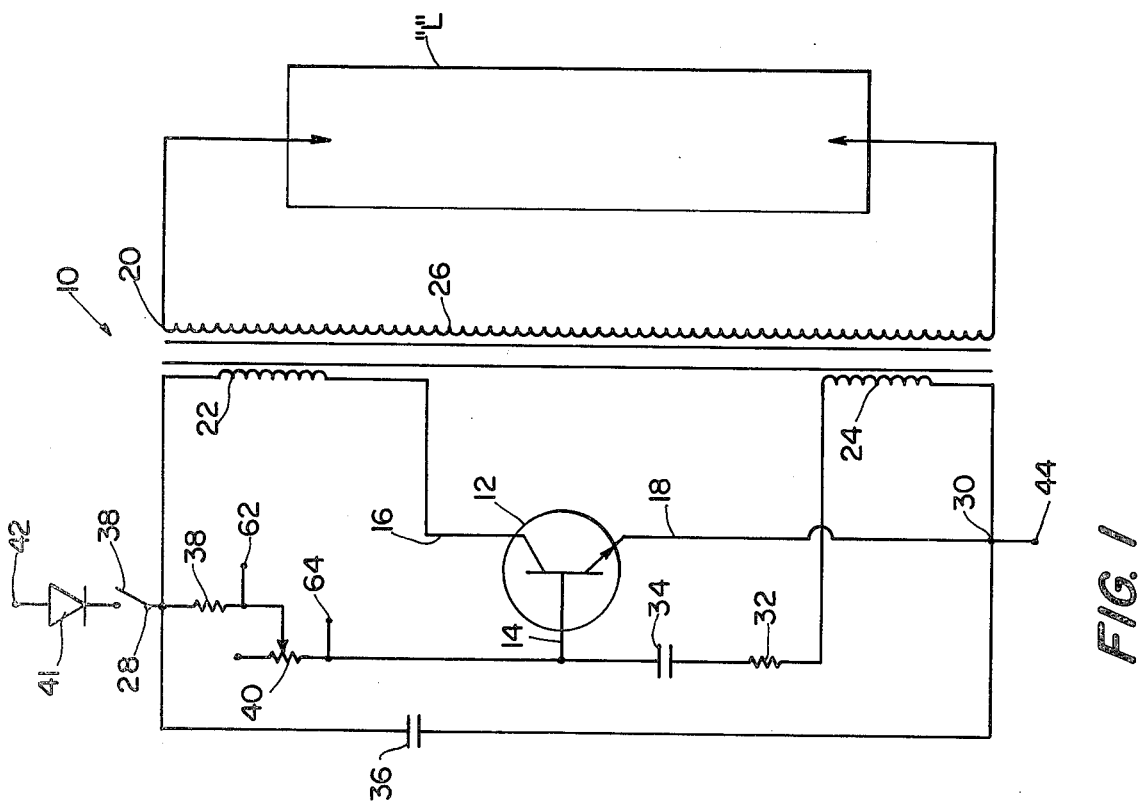

LIGHTING SYSTEM

The present invention relates to lighting systems and more particularly to an energy efficient oscillator for exciting a fluorescent lamp and a dimmer for further reducing energy consumption.

It is well known in the art that fluorescent lamps, when excited at frequencies substantially above the line frequency, are more efficient light radiators for a given electrical excitation. Such a teaching is exemplified by U.S. Pat. Nos. 3,368,107; 3,389,298; 3,467,887, and 3,573,544.

Because of the desirability to drive fluorescent lamps at higher frequency, numerous patents in the prior art describe relaxation and blocking oscillators for such an excitation. Such teaching is exemplified in U.S. Pat. Nos. 3,019,370; 3,501,674, and in particular, 3,016,478; as well as French Pat. Nos. 1,123,405; 1,204,782; 1,221,834; 1,236,083; 1,345,713, and 1,188,687.

While these circuits can increase the efficiency of operation of the lamp as compared with direct excitation from line frequency they do not provide adequate controls to reduce the light output of the fluorescent lamp in a manner further reducing energy consumption. This is particularly advantageous with portable units powered from a battery. Dimmers in the prior art for gas discharge tubes such as a fluorescent lamp are exemplified by U.S. Pat. Nos. 2,930,989; 3,119,048; 3,389,298, and 3,573,544. However, it has been found that the particular blocking oscillator and dimmer of the present invention provide superior energy savings and permit smaller and lighter packaging thereby facilitating portability and enabling the lighting system to be placed in situations where space, weight and electrical power availability are at a premium such as for emergency exit signs and cordless restaurant table lamps.

Energy efficiency is important for a number of reasons. If a large number of lamps are used for a length of time, such as in hallways of apartment buildings or to light playing fields such as tennis courts, the cost of electricity to operate the lamps can still be substantial. If the lamps can be used more efficiently, a smaller wattage lamp can be used permitting a cost saving not only for the electricity to operate the lamps but also for reduction of heat where air conditioning is important in the lighted area. Additionally, for battery operated situations, such as portable or emergency lamps or lamps where it is desirable not to have to run an electrical cord, the lamp efficiency is of utmost importance. A more efficient lighting system permits either a smaller and lighter battery and package or in the alternative, longer life for a given battery size. For an emergency light placed in public areas to provide temporary light in case of a power failure, it is essential that the lamp provide light for a minimum of two hours and it is highly desirable that the lamp remain lit for up to five hours. Such a requirement is extremely difficult to meet with the presently available lighting systems.

For portable units, it is also desirable that the lamps can be operated from the AC line when this source of power is available. Accordingly, it is desirable to reduce the high AC line voltage down to the level of the battery voltage in an energy efficient manner. Also the power supply should preferably add a minimum of weight and size to the unit so as not to impede portability. Prior art portable fluorescent lamps and AC power supplies for fluorescent lamps are exemplified in U.S. Pat. Nos. 3,283,144; 3,467,887; 3,629,648, and 3,758,823. In any such portable units it is desirable that the voltage reduction not be accomplished by an iron core transformer which adds significant cost, bulk and weight to the lighting unit.

For portable units where battery power is at a premium, it is particularly desirable that the fluorescent lamp be lit without wasteful filament current being expended. However, cold start lamps are harder to ignite than heater fluorescent lamps. Accordingly, it is desirable that a cold start lamp be used and that means be provided to efficiently start such a lamp, such as by momentarily increasing the electrical excitation to the lamp until the lamp has started properly.

In order to save electricity, or to set a selected lower light intensity, it is desirable that, whether portable or AC operated, the lamp can be adjusted to reduced brightness and that the adjustment be made simply and inexpensively. It is also desirable that the lamp be adjustable for a varying degree of light intensity where full light output is not desirable, such as in a restaurant, or the like, where a candlelight mood is desired.

Additionally, and particularly with battery operated units, the circuitry is subjected to wide variations in power supply voltage and it is desirable that the lighting system be tolerant of wide voltage variations to work at substantially lower voltage than the nominal battery or line voltage.

Accordingly, it is an object of the present invention to provide a lighting system providing the foregoing advantages over the prior art.

It is another object of the present invention to provide an energy efficient AC-DC lighting system.

Yet further it is an object to provide control circuits for continuously variable means dimming and for starting the lamp when cold without use of filament heat energy.

A further object of the present invention is to provide a lighting system for connection to the AC line wherein the stepdown power transformer is compact and light in weight and does not use a bulky and heavy iron core transformer.

Yet another object of the present invention is to provide an emergency lighting system having a battery and charging means for said battery and means connecting the battery to the lamp circuit when the AC line voltage falls below a threshold voltage.

Still another object of the present invention is to provide a lighting system using a stepdown power transformer comprising a capacitor wherein surge and transient voltage protection is provided.

Further objects and advantages of the present invention will become apparent as the following description proceeds and the features of novelty characterizing the invention will be pointed out with particularly in the claims annexed to and forming a part of this specification.

Briefly, the present invention comprises a lighting system for gas discharge tubes such as fluorescent lamps. An energy efficient oscillator circuit comprises a semiconductor amplifying device, such as a transistor, connected to a transformer having three windings so as to form a blocking oscillator to electrically excite the lamp. Dimmer means in the form of a variable resistance device is connected in series with the base circuit elements for reducing power consumption of the lamp and power drawn from the power source. A power supply transformer having transient voltage protection is provided comprising a full wave rectifier having a voltage dependent resistor connected thereacross and a voltage dropping capacitor in series therewith for providing a transformed low voltage secondary DC voltage without a bulky and heavy magnetic circuit transformer.

A charging circuit is provided to charge a battery and connect the charged battery to the lamp circuit when the primary AC line voltage falls below a threshold voltage. A relay means is provided to provide full electrical excitation to the lamp when cold to facilitate starting.

For a better understanding of the present invention reference may be had to the accompanying drawings wherein the same reference numerals have been applied to like parts and wherein:

FIG. 1 is a schematic diagram illustrating one embodiment of a dimmer circuit of the present invention;

FIG. 2 is a schematic diagram showing another embodiment of the present invention;

Figure 3:
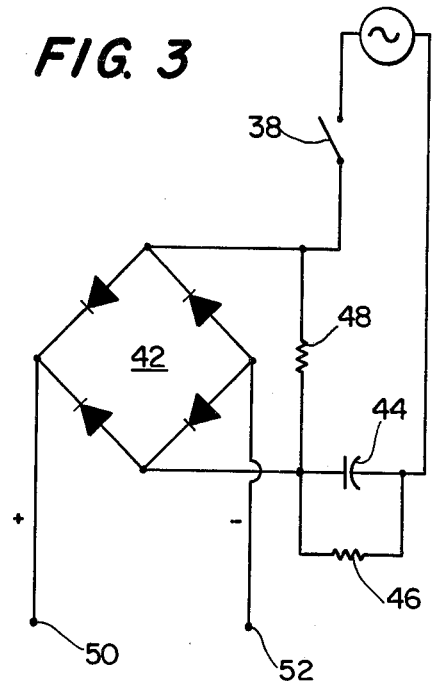
FIG. 3 is a schematic diagram showing a power supply and transformer in accord with the present invention.

Referring now to the drawings, there is shown in FIG. 1 a lamp excitation circuit comprising a blocking oscillator, generally designated 10, including an electrical device, such as a transistor or the like, 12 having a control electrode or base 14, and a collector and emitter electrodes 16 and 18. A transformer 20 comprising a first, second, and third windings 22, 24 and 26, is connected between the transistor 12 and the lamp "L." The first winding 22 is connected between the collector 16 and a first polarity of DC voltage at terminal 28. The third winding 26 forms the high voltage secondary of the transformer 20 and is connected across the lamp "L." The second winding 24 is connected between a second polarity of DC voltage at terminal 30 and a reactance network comprising a resistor 32 and a capacitor 34 connected in series with each other and are in turn connected to the base 14. A dimmer control 40 comprises a variable resistance device connected in series with a fixed resistor 38, and are in turn connected between the terminal 28 and the base 14. A capacitor 36 is connected between the first and second terminals 28, 30 and a switch 38 is connected in series with the terminal 28.

Figure 6A:
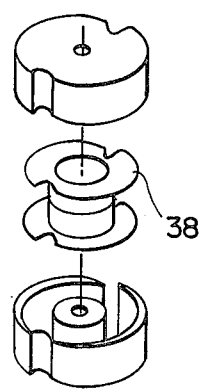
FIGS. 6a and 6b show an oscillator transformer for use in FIGS. 1 and 2.
Figure 6B:
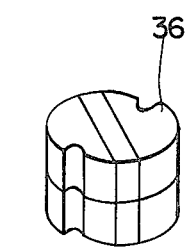

The transformer 20 is wound upon a ferrite cup core 36 (FIG. 6) such as Mullard No. LA 1214 having a core diameter of 30 mm and an AL value of between 260 and 400. The windings are disposed upon a bobbin 38 placed about the pot core and are random wound. Winding 22 is wound first and comprises 23 AWG wire with high temperature enamel insulation and 40 linear inches exclusive of external connections. Winding 24, comprising 15 linear inches exclusive of external connections of 23 AWG wire with high temperature enamel insulation is random wound over winding 22 with one layer of paper insulation between windings. Winding 26 comprises 190 linear inches exclusive of external connections of 32 AWG wire with high temperature enamel insulation and is random wound over the winding 24 with two layers of paper insulation between the windings. The length of winding 26 is optimum for an 8 watt 12 inch standard fluorescent tube and is optimally different for different tube sizes for maximum efficiency. In the alternative, a two section bobbin can be used with the windings 22 and 24 random wound on one section and the winding 26 random wound on the other section in side by side fashion.

It has been found that the cup core is more efficient having an outside wall thickness of 3 mm, round in shape and provided with a gap of between 0.5 and 1.5 mm. The ferrite core 36 is then filled with potting compound which should have good insulation properties and not be excessively exothermic when curing.

Referring again to FIG. 1, the dimmer control 40, in the exemplary embodiment, comprises a variable resistance control. However, it is within the contemplation of the present invention that other variable resistance devices can be used such as a selector switch having stepped discrete resistors, a photocell, or a biased field effect transistor, or the like. The transistor 12 of the exemplary embodiment is a heat-sinked 2N3055 or the like, and being an NPN, the terminal 42 is connected to a source of DC voltage of positive polarity and the terminal 44 to a negative polarity. The base current for the transistor 12 is varied by changing the resistance value of control 40. The larger the base current, the larger the corresponding transformer currents and accordingly, the stronger the excitation of the lamp "L." Accordingly, bias or quiescent current into the base 14 is also affected by the resistance value of the control 40.

The blocking oscillator is free-running and oscillates in a manner known in the prior art, particularly French Pat. No. 1,188,687. However, the oscillator circuit of the present invention has a non-sinusoidal waveform and operates in an unusually efficient manner thereby producing high frequency components which excite the gases of the lamp. The fundamental frequency of oscillation is approximately 24 Khz but contains substantial high frequency harmonic components. Once the lamp is properly ignited, the gases easily maintain ignition at the higher excitation frequencies. In this manner, the lamp once lit can be maintained lit by increasing the resistance of the dimmer control 40 so that as little as 50 ma passes through the lamp at a reduced voltage.

In the exemplary embodiment, resistor 38 is a 5 watt 15 ohm wirewound resistor, resistor 32 is a 5 watt 20 ohm wirewound resistor, but can be between 10 and 30 ohms depending on the type of transistor used, and the control 40 is a 1 to 5 watt 700 ohm wirewound potentiometer.

The capacitor 34 is usually a 0.12 to 0.15 mfd ceramic capacitor, the exact value depending on the transistor used. The capacitor 34 is charged towards the B+ voltage at terminal 42 by the bias circuit 38 and dimmer control 40 and upon reaching sufficient voltage discharges through the base 14 and emitter 18 of the transistor 12 thereby modulating the amplitude of blocking oscillation. Once the capacitor 34 has sufficiently discharged through the base 14 the transistor 12 will resume oscillation at the original amplitude and at the blocking oscillation frequency which is higher than the relaxation oscillation frequency determined by the capacitor 34 and the charging network. Thus, the blocking oscillator is modulated at a free-running lower frequency rate so that the amplitude of the blocking oscillator is periodically varied to form bursts of high frequency oscillation. The modulation of the high frequency oscillation serves to further increase the harmonic content of the lamp excitation.

The capacitor 36 is a large power supply electrolytic capacitor of sufficient value to smooth out any transient changes of power supply at the terminals 42, 44 and to compensate for any changes in the AC impendance of the power supply or battery across terminals 42, 44. The exemplary embodiment is intended to operate from a battery supply, and accordingly, the switch 38 is included and a diode 41 is provided in series with the battery to protect the circuit 10 from being inadvertently connected in reverse polarity to the battery. The circuit is designed to operate off a 12 volt lead acid battery or the like.

Referring now to FIG. 2, there is shown another embodiment of the circuit of FIG. 1, wherein changes have been made to optimize oscillator operation from a DC voltage provided by an AC power supply. The dimmer control 40 is now connected in series with the resistor 32 and is a 1 K ohm control, and the switch 38 is mounted on the rear of the control 40 for switching the AC power supply on and off (see FIG. 3). Winding 26 is changed to 36 AWG wire size of the same length and filter capacitor 36 is now provided with up to 100 volts working voltage. The operation of the circuit is the same as before except that the action of the dimmer control 40, now being on the ground or negative polarity side of the base 14, has a reverse action with a larger resistance setting producing a larger electrical excitation to the lamp and consequently increasing the brightness of the lamp. Additionally, the capacitor 34 blocks quiescent currents from passing through the conrol 40.

Referring now to FIG. 3, there is shown a power supply transformer for operating the circuit of FIG. 2 from an AC line voltage of 120–240 volts. A full wave bridge 42 is connected in series with a voltage dropping capacitor 44 and the series circuit is connectable across the AC line voltage. A resistor 46 is connected across the capacitor 44 and a voltage dependent resistor (VDR) 48 is connected across the full-wave rectifier bridge 42. Terminals 50 and 52 are connected to terminals 42, 44 respectively of FIG. 2.

The circuits of FIGS. 1 and 2 are designed to operate off 12 volts DC, the modifications to FIG. 2 being made to accommodate the ripple of the voltage supply not present in the power supply for the circuit of FIG. 1. It is desirable for a portable, energy efficient unit that a heavy and bulk power transformer not be used and accordingly, the capacitor 44 drops the voltage to the bridge and the value of the capacitor is chosen so that the output voltage from the bridge 42 will be nominally 12 VDC for a given lamp load. In the exemplary embodiment, capacitor 44 is an 8 mfd electrolytic which provides for the proper DC supply voltage to the 8 watt, 12 inch lamp. The value of the capacitor 44 is different for different loads to maintain the correct DC voltage since the regulation of the power supply circuit is poorer than the regulation of the full wave rectifier alone.

The VDR 48 is connected across the bridge and protects the rectifier bridge 42 and the lamp circuitry from transient voltages caused by turn-off and quick turn-on. The VDR 48 exhibits a bi-directional change of resistance once the voltage across the resistor 48 exceeds a particular value. In the present embodiment, when a transient voltage of either polarity across the resistor 48 exceeds 24 peak volts the resistance of the resistor 48 becomes substantially zero thereby shorting the input to the bridge 42 and shunting the excess voltage thereacross. It has been found that the resistor 48 has a switching time faster than an appropriate pair of back to back zener diodes, has a lower shunting resistance, and is able to more economically withstand any power dissipated in the voltage protection device. The resistor 46 discharges any DC voltage that may appear across the capacitor 44 during turn-off and turn-on and in the exemplary embodiment, is a 250 to 500 K ohms ½ watt carbon resistor.

Figure 4:
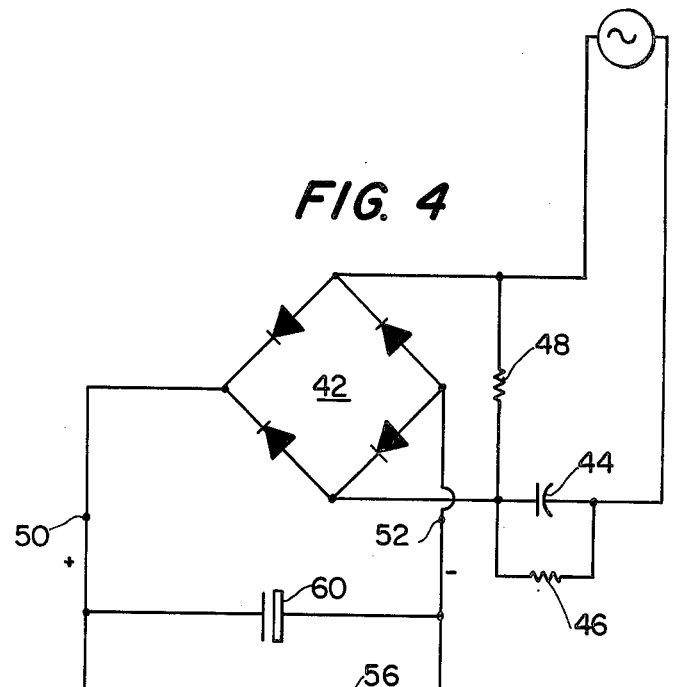
FIG. 4 is a schematic diagram showing a battery charger and a line voltage sensing circuit according to the invention.

Referring now to FIG. 4 there is shown a power supply for an emergency trouble light or the like. The power supply and transfomer of FIG. 3 is connected to a battery charging circuit to trickle charge the battery "B" and the lamp excitation circuit of FIG. 2 is connected to the power supply through the contacts 54 of a relay 56. The battery "B" is connected across terminals 50, 52 of FIG. 3 through a current limiting resistor 58 with a voltage limiting zener diode 60 shunting the battery. The values of the resistor 58 and the zener diode 60 are chosen according to the type of battery used which can be mercury, nickel cadmium, alkaline, or lead acid, or the like, since each type of battery has different charge and discharge characteristics. The resistor 58 also serves as a current limiting discharge resistor and should be of sufficient wattage to withstand a short circuit across the battery load.

The relay 56 and a filter capacitor 60 are connected across the DC voltage at terminals 50, 52. The contacts 54 are normally closed and when the DC voltage is above a predetermined threshold value, the relay is energized and the contacts 54 open disconnecting the lamp circuit of FIG. 2. If the AC line voltage should fail or fall below a threshold voltage, the relay will not be sufficiently energized and will sense the corresponding change in the rectified DC voltage and switch the contacts 54 thereby connecting the lamp circuit of FIG. 2 to the battery "B" through the coil of the relay 56.

In this manner, the battery "B" remains on trickle charge and the lamp circuit is not energized until there is a power failure, in which case, the battery is switched and energizes the lamp circuit which provides the necessary light for public areas to permit evacuation of the area or light exit signs. It is particularly in this kind of situation where the dimmer control is invaluable as it is desirable to permit the emergency lamp to be lit for as long as possible at reduced battery drain. Currently available emergency lamps are capable of two hours light upon AC line failure; however, recently proposed standards specify five hours as a minimum. The lamp can be adjusted to reduced brightness and yet accommodate the requirements of the given area since each have a different area and require different lighting intensity for evacuation of the area. Thus the light output can be tailored to optomize the light output to fit the situation with a corresponding decrease in power drain.

Commonly used fluorescent lamps require a filament to start the lamp. The filament partially warms the lamp until there is ignition and then the filament is disconnected. Filament power is very wasteful and it is desirable to use a cold start lamp. However, a cold start lamp requires greater excitation when cold to start ignition. Once ignition is achieved, the excitation can then be reduced as the lamp has been, at least, partially self-heated. The lighting system of the present invention is designed to operate a cold start lamp and eliminate the wasted power of the filaments. Filament lamps can be used, but the filament is unheated and serves as a conductor of the lamp current.

Figure 5:
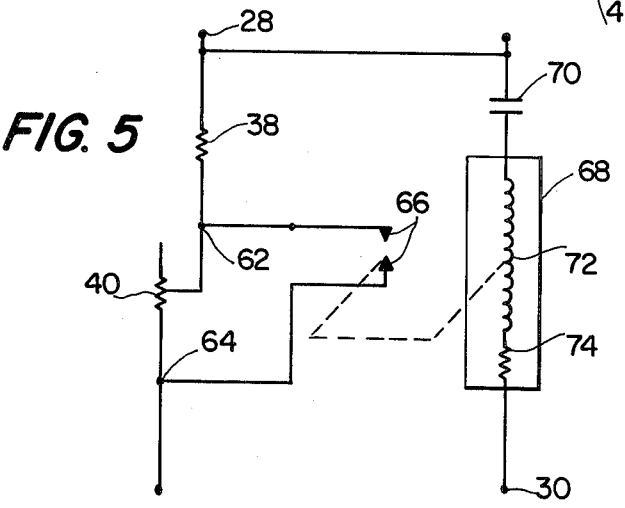
FIG. 5 is a schematic diagram showing a lamp starter circuit according to the invention.

Although the lighting system of the present invention has excellent cold start ignition characteristics, it is sometimes desirable to further facilitate turn on ignition, particularly where the environmental temperature is low. FIG. 5 shows a turn-on circuit for the lamp circuit of FIG. 1.

Referring now to FIG. 5, the dimmer control 40 of FIG. 1 is provided with a pair of terminals 62, 64 across which normally open contacts 66 of relay 68 are connected. The relay 68 is connected in series with a capacitor 70 and the series cicruit is connected across the DC voltage appearing across terminals 28, 30 of FIG. 1. Upon turn-on, the capitor 70 is substantially uncharged and a high current flows through the relay coil 72 of relay 68 energizing the relay 68 closing the normally opened contacts 66 thereby shorting out the dimmer control 40 and increasing the excitation to the lamp "L" for turn-on of the cold lamp.

The capacitor 70 and the internal resistance 74 of the relay coil 72 form a charging time constant for the capacitor 70. The capacitor 70, typically 1,000 to 2,000 MFD, charges toward the power supply voltage thereby reducing the current through the relay 68. When the charge current decays to a particular value, the relay terminals open, permitting the dimmer control to again reduce the brightness of the lamp at a pre-set value. A typical turn-on time for the relay 68 is about 3-4 which is sufficiently time for the lamp 68 to self-heat and remain ignited under reduced excitation.

While there has been illustrated and described what is at present considered to be a preferred embodiment of the present invention, it will be appreciated that numerous changes and modifications are likely to occur to those skilled in the art and it is intended in the appended claims to cover all those changes and modifications which fall within the true spirit and scope of the present invention.

What is claimed as new and desired to be secured by Letters Patent of the United States is:

1. The combination of a gas discharge lamp and circuitry for exciting the gas discharge lamp comprising a transformer having a first, second and third windings, the third winding being connected to the gas discharge lamp, an electrical device having first, second and third electrodes, the first and second electrodes being controllable by electrical excitation connected to the third electrode, the first electrode being connected to the first end of the first winding, the second end of the first winding and the second electrode being respectively connected to a first and second polarity of a source of DC voltage, a resistor means connected between the second end of the first winding and the third electrode, the second winding having the first end connected to the second electrode, a reactance means connected between the second end of the second winding and the third electrode, the resistor means comprising a first fixed resistor, the reactance means comprising a second fixed resistor and a first capacitor connected together with such parameters and polarities as to produce a freely running blocking oscillator having an oscillation frequency substantially greater than line frequency and rich in harmonics, and dimmer means for changing the light output of the gas discharge lamp, the dimmer means comprising variable resistance means in one of said resistor and reactance means and having settable resistance values such that the current through the first electrode and the electrical excitation to the lamp is dependent upon the respective set resistance value and being changeable upon resetting the resistance value thereby changing the light output of the lamp whereby upon connection of the circuit to the source of DC voltage, the circuit is activated and blockingly oscillates, and the current through the first electrode is coupled to the third winding thereby causing a changeable AC voltage at the pair of terminal wires able to excite said gas discharge lamp thereby causing the lamp to light.

2. The circuit of claim 1 wherein the variable resistance means is comprised as a portion of the resistor means and is connected in series with the first fixed resistor.

3. The circuit of claim 1 wherein the variable resistance device is comprised as a portion of the reactance means and is connected in series with the second fixed resistor and the capacitor.

4. The circuit of claim 3 wherein the electrical device is provided with quiescent currents and none of the quiescent currents of the circuit pass through the dimmer means.

5. The circuit of claim 2 wherein the third electrode of the electrical device is provided with a bias current and the dimmer means also changes the bias current.

6. The circuit of claim 2 wherein a relay means having resistance and a pair of normally open contacts is connected in series with a second capacitor and the series circuit is connected across the source of DC voltage, the contacts being connected across the variable resistance means, the series circuit having a charging time constant whereby upon turn on the DC current flow through the series circuit including the resistance and the uncharged second capacitor is high so that the relay means is activated and the contacts are closed shorting out the variable resistance means thereby momentarily increasing the electrical excitation to the lamp and facilitating ignition to the cold lamp, and after the current through the second capacitor has decayed to a threshold value, the contacts open unshorting the variable resistance means and return the electrical excitation to lamp to the preset magnitude once the lamp is properly ignited.

7. The circuit of claim 1 wherein the transformer windings are wound about a common core and are enclosed in a ferrite cup core.

8. The circuit of claim 7 wherein a gap is provided between the portions of the cup core and the windings are wound upon a bobbin enclosing the common core.

9. In the combination of a gas discharge lamp and a high frequency oscillator lighting said lamp, a power supply therefor transforming a primary AC line voltage to a lower secondary AC power supply voltage to supply power to said combination and for protecting the combination from harmful power supply transients comprising a capacitor connected in series with the line to the combination for providing an AC voltage drop across the capacitor, and a voltage dependent resistor connected across the capacitor, and a voltage dependent resistor connected across the combination, the voltage dependent resistor having a bidirectional breakdown voltage slightly higher than the peak sinusoidal secondary voltage across the combination so that harmful transient voltages exceeding the peak sinusoidal secondary voltage will be shunted across the combination.

10. The transformer of claim 9 wherein the combination includes a full-wave rectification means for providing a DC voltage source having a regulating characteristic, the voltage dependent resistor is connected across the input to the rectification means having a better regulation characteristic than said power supply.

11. For a standby emergency lamp having a gas discharge lamp and lamp circuitry for lighting the lamp, in combination, a power supply, a chargeable battery, and power supply therefor with a battery recharging circuit comprising a capacitor, a full wave rectifier circuit connected in series with the capacitor, the series circuit being connectable across an AC line voltage for providing a source of DC voltage, a charging circuit connected across the source of DC voltage for charging the battery comprising current and voltage limiting means for limiting the charging current and voltage to the battery, emergency switching means operable from a voltage sensing means for determining whether the AC line voltage is below a predetermined threshold voltage, the voltage sensing means comprising a relay means switchably controlling a pair of normally closed contacts, the relay means being connected across the source of DC voltage, and the lamp circuit connected to the battery through the contacts, the lamp circuit being unenergized as long as the AC line is above the predetermined threshold voltage, the contacts being switched by the relay means when the AC line voltage is below the threshold voltage thereby connecting the charged battery to the lamp circuit so that the gas discharge lamp will light.

12. The power supply of claim 11 wherein the lamp lighting circuit is connected to the source of DC voltage through the contacts, the relay means comprises a coil of a relay, and the lamp circuit is a blocking oscillator for energizing the gas discharge lamp.

13. The power supply of claims 11 or 12 wherein a voltage dependent resistor is connected across the input to the rectifier and has a bi-directional breakdown voltage slightly higher than the peak sinusoidal voltage across the input to the rectifier.

14. In combination, a gas discharge tube and an excitation circuit and comprising a blocking oscillator having a transformer provided with a first, second and third windings, the third winding being connected to the gas discharge lamp, an electrical device having a first, second and third electrodes, the first and second electrodes being controllable by electrical excitation connected to the third electrode, the first electrode being connected to the first end of the first winding, the second end of the first winding and the second electrode being respectively connected to a first and second polarity of a source of DC voltage, a resistor means connected between the second end of the first winding and the third electrode and comprising a first fixed resistor, the second winding having a first end connected to the second electrode, a reactance means connected between the second end of the second winding and the third electrode, and comprising a secnd fixed resistor and a first capacitor connected in series, dimmer means for changing the light output of the lamp, the dimmer means comprising a variable resistance means being comprised as a portion of the resistor means, the dimmer means having settable resistance values, the current through the first electrode and the electrical excitation to the lamp being dependent upon the respective set resistance value and being changeable upon resetting the resistance value thereby changing the light output of the lamp, a relay provided with a coil having resistance and having a pair of normally open contacts, the relay coil being connected in series with a second capacitor and connected across the source of DC voltage, the contacts being connected across the variable resistance means, the resistance of the coil and the second capacitor having a charging time constant whereby upon turn on the DC current flow through the series circuit including the uncharged second capacitor is high so that the relay is activated and the contacts are closed shorting out the variable resistance control thereby increasing the electrical excitation to the third electrode of the electrical device and providing a higher excitation to the third winding and momentarily increasing the electrical excitation to the lamp and facilitating ignition to the cold lamp, and after the current through the second capacitor has decayed to a threshold value, the contacts open unshorting the variable resistance means and return the electrical excitation to the lamp to the preset magnitude once the lamp has been properly ignited, the source of DC voltage comprising a full wave rectifier circuit connected in series with a third capacitor, and connectable across an AC power line, and a voltage dependent resistor connected across the input of the full wave rectifier circuit and having a bi-directional breakdown voltage slightly higher than the peak sinusoidal voltage across the input of the full wave rectifier circuit so that harmful transient voltages exceeding the peak sinusoidal voltage will be shunted across the rectifier circuit.

15. The circuit of claim 14 further comprising a charging circuit connected across the source of DC voltage for charging a battery and comprising current and voltage limiting means for limiting the charging current and voltage to the battery, and voltage sensing means for determining whether the AC line voltage is below a predetermined threshold voltage, the voltage sensing means comprising a second relay having a pair of normally closed second contacts and a second coil connected across the source of DC voltage, the contacts being switchable by the relay when the AC line voltage is below the threshold voltage thereby connecting the charged battery to the blocking oscillator to keep the lamp lit.

16. The combination of a gaseous discharge lamp and an oscillatory power supply for saving lamp excitation energy and providing a variable range of lamp intensity comprising, a two terminal power source supplying operating energy, an oscillator connected to the lamp providing a voltage sufficient to light said lamp, a frequency high enough to produce efficient lamp operation, and a non-sinusoidal waveform rich in harmonics, and a control circuit in the oscillator comprising variable resistor means varying the characteristic of the waveform to reduce both the energy lighting the lamp over a variable dimming range and energy provided from the power source.

17. The combination defined in claim 16 wherein the gas discharge lamp is solely excited during starting and operation by means of opposed unheated electrodes.

18. The combination defined in claim 16 wherein the power source is AC, said oscillatory power supply comprises a transformer with windings and an electrical device having a plurality of first electrodes and a control electrode, one winding of the transformer being connected between one of the first electrodes and a first terminal of the power source, the variable resistor means being connected between the first terminal of the power source and the control electrode.

19. The combination defined in claim 16 wherein the power source is DC, said oscillatory power supply comprises an electrical device having a plurality of first electrodes and a control electrode and wherein the variable resistor means is connected between the control electrode and one of the first electrodes.

20. The combination defined in claim 16 wherein the oscillatory power supply further comprises free-running means for varying the oscillator amplitude periodically at a lower frequency than the oscillator fequency.

* * * * *